22. LIQUID HEATERS & VAPORIZERS,
Fire
122-58.R 44
EXA

BEST AVAILABLE COPY

2 Sheets-Sheet 1.

R. & T. Minans.

Locomotive Fire-Box.

No. 471. Reissued June 16, 1857.

N. PETERS, PHOTO-LITHOGRAPHER, WASHINGTON, D. C.

BEST AVAILABLE COPY
2 Sheets-Sheet 2.
R. & T. Minans.
Locomotive Fire-Box.
No. 471. Reissued June 16, 1857.
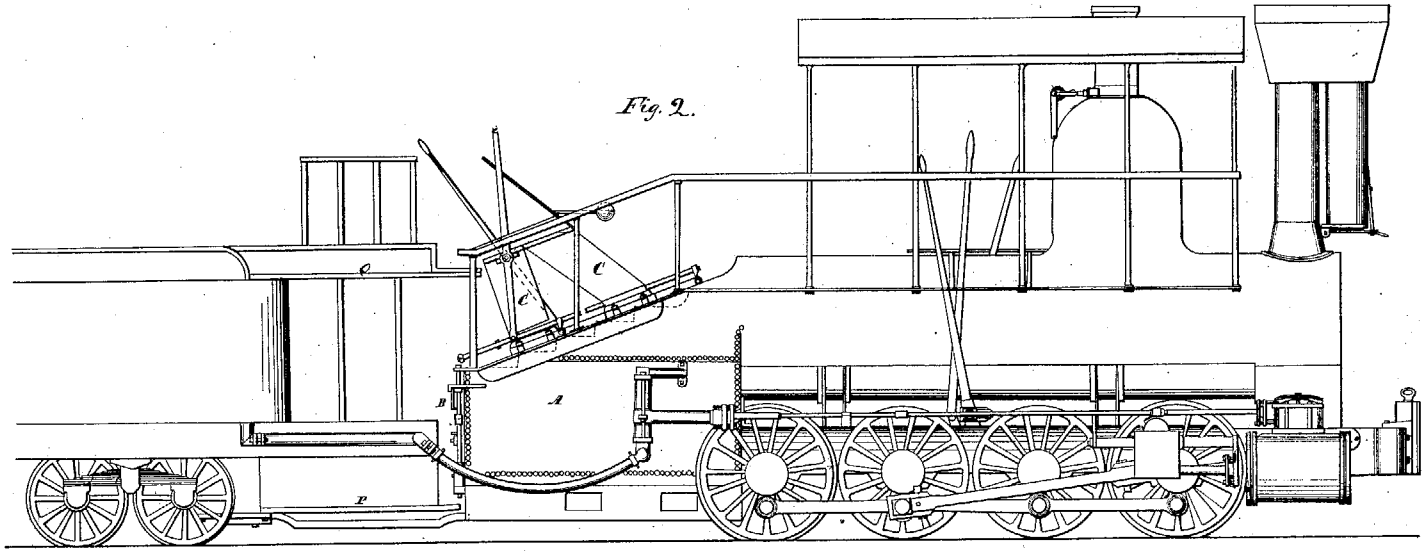
W. PETERS, PHOTO-LITHOGRAPHER, WASHINGTON, D. C.

UNITED STATES PATENT OFFICE.

ROSS WINANS AND THOMAS WINANS, OF BALTIMORE, MARYLAND.

IMPROVEMENT IN LOCOMOTIVE-TENDERS.

Specification forming part of Letters Patent No. 10,971, dated May 23, 1854; antedated May 9, 1854; Reissue No. 471, dated June 16, 1857.

*To all whom it may concern:*

Be it known that we, ROSS WINANS and THOMAS WINANS, of the city of Baltimore, in the State of Maryland, have invented a new and useful Improvement in Locomotive-Engines, having particular reference to the burning of coal as fuel, of which the following is a full, clear, and exact description, reference being had to the drawings which are hereto annexed, in which—

Figure 3:
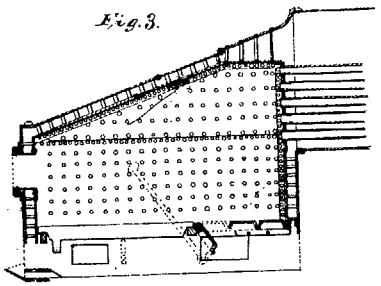
Figure 1:
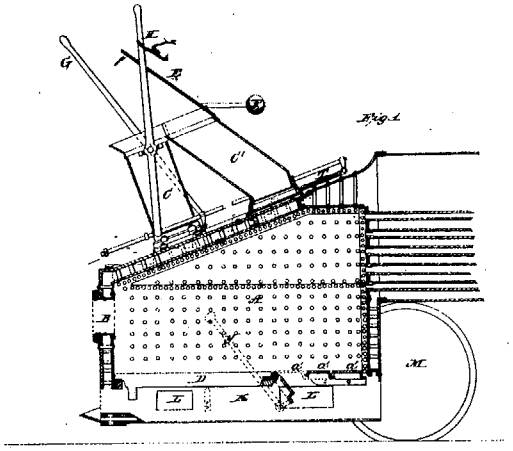
Figure 4:
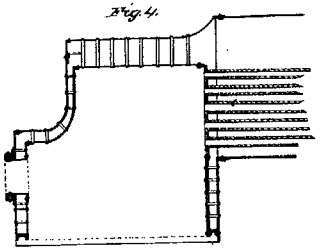

Figure 1 represents a vertical longitudinal section of the fire-box of a locomotive adapted to the use of coal as fuel. Fig. 2 represents a side elevation of such a locomotive and the tender devised by us therefor; and Figs. 3 and 4 represent vertical longitudinal sections of the fire-boxes of locomotives constructed to be fired from a single fire door, showing the size of our fire-box compared with the largest manufactured by Ross Winans prior to our invention.

In devoting himself to the improvement of locomotive-engines for burning anthracite and bituminous coals, Ross Winans, one of the present claimants, found that one of the most essential requisites in such a locomotive was a large area of grate-surface, because coal burns much more slowly than wood, and a greater weight thereof must be maintained in ignition at a time, and because coal can only be burned with success and economy when spread over the grate-bars in a stratum of a few inches in thickness. In endeavoring to obtain this enlarged grate-surface many obstacles were encountered, resulting mainly from the position of the frame of the engine, the necessity of procuring an equal distribution of the weight of the engine upon its wheels, and the difficulty of inspecting and cleaning the fire box and grate while the engine was in motion. He, however, succeeded in overcoming these obstacles by inventions for which he has applied for Letters Patent of the United States, and by which he has been enabled to construct a locomotive fire box and grate of larger dimensions than had been obtained, without affecting the efficiency of the engine in other respects. In prosecuting his experiments to increase the dimensions of the grate he was met by the difficulty of distributing coal over a grate of great length from a fire-door located at the hinder end of the fire-box, and by the difficulty resulting from the admission through the fire-door of a large mass of cold air, which passed into the fire-box and flues; for, as the door had necessarily to be kept open a large portion of the time to permit of the ready charging of the fuel, the air entered through it and cooled the flame above the grate, instead of through the grate-bars, to promote the combustion of the fuel.

The object of our invention is to overcome the beforementioned and other difficulties which are incident to the employment of a fire-box of large size.

In order to feed the fire-box with fuel without opening the fire-door at the rear of the fire-box, and without the admission of an injurious quantity of cold air above the fuel, we have constructed the furnace of the locomotive with fire holes or doors at suitable points in its roof, in addition to the lower fire-door at the rear, and we have fitted the upper fire-holes with feed-boxes having doors at both their upper and lower ends, one of which may always remain closed. This method of construction permits the ready charging of coal to a fire-box of great length, provided some means be devised to supply the fuel from the tender. In order to accomplish these purposes we have combined with a locomotive-furnace, having upper and lower fire-doors, a tender having an upper and a lower platform, the latter serving as a stand for the fireman while charging fuel through the door at the rear and while cleaning the grate, and the upper platform enabling the fireman to supply fuel to the feed-boxes. By this invention the difficulty of supplying coal to a long grate from a tender is obviated. The feed-boxes also may be used with great advantage to heat the fuel before it is admitted to the fire-box, by permitting the fuel to remain in them before opening their lower doors. The fuel may also be fed in small quantities, and its supply regulated, by the partial opening of the lower doors of the feed-boxes.

In the locomotive and tender represented in the accompanying drawings, the fire-box A is surmounted by two feed-boxes, C and C′, each of which is fitted at its lower end with a sliding door, which can be opened and closed, independently, by levers H and G. The upper ends of the feed-boxes converge, and are closed by a single-flap door, E, which is fitted with a counterpoise, F, by which it is held open when it has been raised to permit fuel to be thrown into the feed-boxes. The lower fire-door, B, is located in the usual position at the hinder end of the fire-box. Fuel is fed to the fire-box through the lower door from the lower platform, P, of the tender, which is suspended from the side pieces of the tender. The lower platform is surmounted by the upper platform, Q, which is supported above the side pieces by suitable standards, and projects forward sufficiently to enable the fireman from it to fill the feed-boxes with fuel and to open and close the doors with ease.

From the ease with which a locomotive fire-box of great length may be fed with fuel by means of our improvement, the length of the fire-box of the locomotive may be increased beyond the limits which have heretofore been reached; and the increased weight due to the increased size is not productive of disadvantage, as the weight of the platforms and the fuel thereon is borne by the tender, thus permitting the extension of the fire-box without injuriously affecting the distribution of the weight upon the wheels of the locomotive. The increase in the size of the fire-box permits a portion of the grate-surface to be made solid or dead, as shown at *a′ a′* in the drawings; and, as the coal burns with much less intensity upon these dead portions, the flue-sheet is affected in a less degree than it would be if the open grate extended up to it. In the example we have shown in the drawings, this dead surface is constructed of sections, one of which may be tipped by means of a lever, *y*, to discharge the ashes which accumulate upon it.

What we claim as our invention, and desire to secure by Letters Patent, is—

The tender, with an upper and lower platform, in combination with and for the purpose of feeding with greater convenience the furnace of a locomotive steam-engine having upper and lower feeding-holes, substantially as herein described.

ROSS WINANS.
THOMAS WINANS.

In presence of—
L. JEWETT GROVE,
JAMES BUSEY.